United States Patent [19]

Pokorny

[11] Patent Number: 4,732,633

[45] Date of Patent: Mar. 22, 1988

[54] METHOD OF PATCHING DAMAGED SHEET MATERIAL

[75] Inventor: Richard J. Pokorny, St. Paul, Minn.

[73] Assignee: Minnesota Mining and Manufacturing Company, St. Paul, Minn.

[21] Appl. No.: 891,598

[22] Filed: Aug. 1, 1986

[51] Int. Cl.$^4$ .............................................. B32B 35/00
[52] U.S. Cl. .................................. 156/94; 29/402.09; 156/154; 156/280; 156/281; 264/36; 428/63; 428/214; 428/215; 428/344
[58] Field of Search .................... 29/402.09, 402.11; 156/94, 98, 154, 280, 281; 264/36; 428/63, 214, 215, 343, 344

[56] References Cited

U.S. PATENT DOCUMENTS

| | | | |
|---|---|---|---|
| 3,470,048 | 9/1969 | Jones | 156/94 |
| 3,582,452 | 6/1971 | Britton | |
| 3,850,718 | 11/1974 | Trapani | 156/94 |
| 4,125,739 | 11/1978 | Bow | 174/36 |
| 4,147,576 | 4/1979 | Beem et al. | 156/94 |
| 4,148,122 | 4/1979 | Phillips et al. | 156/94 X |
| 4,451,605 | 5/1984 | Theodore | 524/423 |
| 4,473,419 | 9/1984 | Hardy | 156/94 |
| 4,496,500 | 1/1985 | Haber | 156/94 X |

Primary Examiner—Robert A. Dawson
Attorney, Agent, or Firm—Donald M. Sell; James A. Smith; David L. Weinstein

[57] ABSTRACT

Method for repairing damaged metal surfaces comprising the steps of:
(1) exposing bare metal surface in the vicinity surrounding the damaged area to be repaired,
(2) cleaning the bare metal surface,
(3) providing a thin, corrosion-resistant patch consisting of a covering member having a face side, back side, and edge side bounded by said face side and said back side, and having a layer of adhesive, preferably a pressure-sensitive adhesive, and coated on said back side, and
(4) applying the corrosion-resistant patch to the damaged surface, said patch adhering to the bare metal surface adjoining and surrounding the patch, and
(5) applying a sufficient amount of flexible putty to the bare metal surface adjoining and surrounding the patch so that a smooth transition running from the face side of said covering member to the metal surface is obtained.

This method does not require the use of two-component body fillers, thus simplifying sheet metal repair for the novice.

10 Claims, 4 Drawing Figures

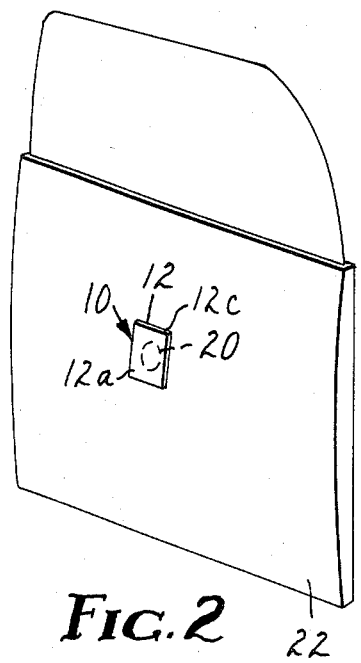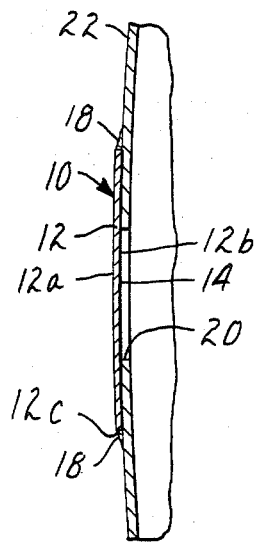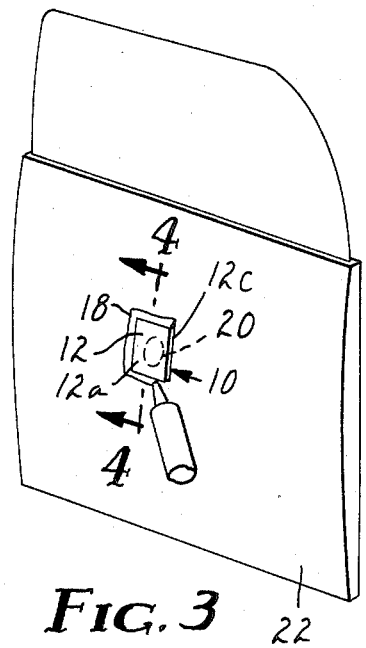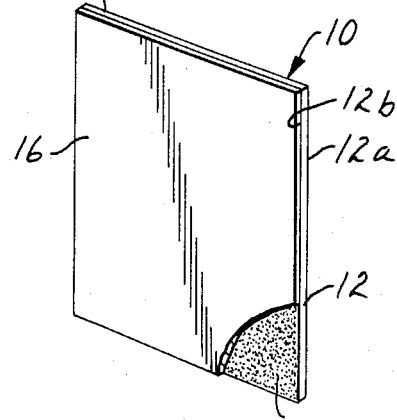
FIG. 2
FIG. 4
FIG. 3
FIG. 1

METHOD OF PATCHING DAMAGED SHEET MATERIAL

BACKGROUND OF THE INVENTION

This invention relates to a method of repairing the surface of a damaged metallic body, and, in particular, for repairing a damaged body of sheet metal.

Sheet metal bodies of motor vehicles are subjected to damage from many sources. Such damage can be caused by collisions with other vehicles or stationary objects, or damage can be brought about by corrosion caused by sodium chloride present in the environment or in road salt.

Many methods for repairing damaged sheet metal surfaces are known. Some years ago, it was common practice to repair a dented surface or a hole in the body by flattening out the surface as well as possible and then applying molten lead to the metal surfaces after the paint had been removed. This molten lead adhered to the metal surface and was built up to a thickness sufficient to produce a smooth outer surface. The repaired area was sanded to provide a smooth continuous surface, and the repaired area was then painted to the color of the original body.

This process of "leading" the injured areas was not only time consuming, but it also required a relatively high degree of skill to accomplish good results. It became more and more common to patch the injured areas through the use of sheets of cold rolled steel shaped to fit the injured area and marginally welded to the metal forming the body. After grinding the marginal edges of the patch and welded area, to produce a smooth surface, the area could be repainted. If the work was skillfully done, there would be little evidence of the repair.

Holes in car bodies have also been repaired by riveting or bolting panels of metal over the damaged area, grinding or mending the patch as smooth as possible, and then leading the adjoining area or applying a suitable filler before repainting. This method is acceptable if the edges of the patch are sealed against the surface repaired, but is costly and time consuming.

The welding or riveting method of repairing car bodies practically replaced the repairing of surfaces by the leading process when plastic filler compositions were developed which could be applied over the patched area to conceal the imperfections.

Such filler compositions are prepared by combining a mixture of a curable polymeric material with a catalyst hardener, applying the mixture to the metal surface to be covered, and allowing the plastic to set. The surface is then sanded and the edges feathered into the surface of the metal itself, covering the entire sheeted area. If the sanding operation is done carefully, the repair is almost impossible to see from visual inspection. This method may lead to some difficulties, particularly when the sheet is applied over a hole or rusted area of the body. Because the inner surface of the metal sheet used for the repair is exposed to the elements through the hole being covered, there is a tendency for the metal to rust out from the under surface after a period of time. Furthermore, because fillers require mixing, and because they are viscous, air becomes entrapped in them during the mixing process, creating voids upon curing, which can allow moisture to penetrate the patch, leading to corrosion.

U.S. Pat. No. 3,470,048 describes a method of patching metal surfaces, such as car bodies, with the use of a patch comprising a backing of sheet metal, such as steel, having bonded thereto a thin foam plastic sheet having a pressure-sensitive adhesive surface protected by a removable release liner. After the surface to be mended is cleaned, the release liner is removed and the patch is applied over the surface to be mended. The edges of the patch are forced into contact with surface to be patched, connecting the metal backing sheet to the surface to be patched through the foam plastic. The patch is then covered with a filler composition which is permitted to cure or dry and the exposed surface ground to the proper contour. The patch described in this patent is quite weak in peel, having a peel strength of only 4.8 lb./in. In peel, the foam would be likely to tear quite easily, which could lead to failure of the repair. Furthermore, the patch described in this patent uses a polyurethane foam of the open-celled type. Any moisture that reaches the edge of the foam will be quickly wicked through it, similar to a sponge. This wicking action will promote corrosion instead of preventing it.

U.S. Pat. No. 3,850,718 describes a metal patching plate fabricated of either aluminum or thin gauged steel which is backed with a layer of high density foam which is double coated with a pressure sensitive adhesive layer. The metal patching plate is useful for the repair of damaged truck trailers and seagoing cargo containers.

U.S. Pat. No. 4,473,419 describes a method comprising the steps of cleaning a repair area, molding a metal patch to conform to the body surface as required, peeling the coating from the adhesive, and pressing the adhesive side of the patch against the body to adhere the patch thereto.

SUMMARY OF THE INVENTION

This invention involves a method for repairing damaged metal surfaces. The method comprises the steps of:

(1) exposing bare metal surface in the vicinity surrounding the damaged area to be repaired, (2) cleaning the bare metal surface, (3) providing a thin, corrosion-resistant patch consisting of a covering member having a face side, a back side, and an edge side bounded by the face side and the back side, said back side having a layer of adhesive, preferably a pressure-sensitive adhesive, coated thereon, (4) applying the corrosion-resistant patch to the damaged surface, so that the back side of said patch is in contact with and adheres to the portion of the cleaned bare metal surface adjoining and surrounding the patch, and (5) applying a sufficient amount of flexible putty to the portion of the damaged surface adjoining and surrounding the patch, and abutting the edge side of the patch, so that a smooth transition running from the face side of the patch to the metal surface is obtained. If necessary, the putty is then sanded to a feathered edge. The repair patch and damaged surface surrounding the patch can then be painted if so desired. In addition, the damaged metal surface should be straightened or bent to the proper contour if so desired.

The method of the present invention improves and simplifies sheet metal repair for the following reasons:

(1) Because the patch is not overcoated with filler, the only sanding that may be required is of the putty abutting the edge side of the patch.

(2) A lower level of skill is required to use putty because mixing of chemicals is not required, as when using conventional body fillers.

(3) Because the patch is made of corrosion-resistant material, the repair is durable.

(4) Because fillers are not used, the patched area will contain no voids, and consequently, moisture will not penetrate through the patch to initiate corrosion of the metal surface.

(5) The patch provides a smooth surface for painting.

BRIEF DESCRIPTION OF THE DRAWINGS

In the drawings forming a part of the specification:

FIG. 1 illustrates a patch suitable for use in the method of this invention.

FIG. 2 illustrates a view of an automotive door having a damaged portion having a patch applied thereover.

FIG. 3 illustrates a view of the door of FIG. 2 after the putty has been applied around the edges of the patch to the metal surface adjoining the damaged area.

FIG. 4 illustrates a cross-sectional view taken along line 4—4 of the patch and door of FIG. 3.

DETAILED DESCRIPTION

Repair patch 10 comprises a covering member 12 having on one major surface thereof a layer 14 of adhesive. A protective peelable release liner 16 covers adhesive layer 14.

Covering member 12 is a thin sheet of durable material having a face side 12a, a back side 12b, and an edge side 12c bounded by the face side and the back side. When the patch 10 is applied to the damaged surface, the face side 12a faces away from the damaged metal surface. The back side 12b bears the adhesive layer 14, and, when the patch 10 is applied to the damaged surface, faces toward and adheres to the damaged surface. The edge side 12c is the thin side of the covering member 12 disposed between the face side 12a and the back side 12b. The preferred material for the patch is a tempered aluminum alloy. A commercially available alloy of this type is 1145 H19 available from International Foils Corp. of Alliance, Ohio. Other materials such as stainless steel, zinc, or polycarbonate can also be used. However, any such material should be resistant to corrosion, solvents, and should be readily conformable to the surface being repaired. The thickness of member 12, i.e. the distance between the face side 12a and the back side 12b, can range from about 0.13 mm to about 0.46 mm, and is preferably about 0.25 mm.

The adhesive for layer 14 should allow the patch 10 to conform to and adhere to rough surfaces. It should have high level of adhesion to steel at both high and low temperatures. The adhesive preferably has a minimum peel strength of 7 lb/in (135 N/100 mm). Preferably, the peel strength should be at least 10 lb/in (190 N/100 mm). Peel strength is measured under the following conditions:

substrate tested: 0.20 mm aluminum foil bonded to stainless steel
adhesive set time: 72 hours
degree of peel: 90°
rate of peel: 305 mm/min It is preferred to use a pressure-sensitive adhesive for adhesive layer 14. It is within the scope of this invention to use other types of adhesives, e.g. thermally-sensitive adhesive. However, the use of a thermally-sensitive adhesive will require that a source of heat be available at the time the repair is being undertaken. Pressure-sensitive adhesives suitable for this invention are preferably selected from solid acrylates, which bond very well to metal and greatly reduce water transmission. A commercially available pressure-sensitive adhesive suitable for this invention is #9668 MP, available from Minnesota Mining and Manufacturing Company, St. Paul, Minn. The pressure-sensitive adhesive referred to as #9668 MP has a peel strength of 12.8 lb./in. This value is significantly higher than the peel strength of the adhesive described in U.S. Pat. No. 3,470,048.

The thickness of layer 14 can range from about 0.05 mm to about 0.38 mm, and is preferably about 0.12 mm. The preferred thickness of the layer of pressure-sensitive adhesive, about 0.12 mm, is much less than the thickness of the foam/adhesive composite layer in U.S. Pat. No. 3,470,048, which is 0.77 mm thick. If the layer of pressure-sensitive adhesive used in the present invention is thicker than about 0.38 mm, obtaining a smooth transition from the face side 12a of the patch 10 to the metal surface surrounding the patch would become much more difficult for the novice. Since a thicker layer of pressure-sensitive adhesive would cause the patch 10 to give a much higher shoulder adjoining the damaged surface, a larger area of the damaged surface surrounding the patch 10 would be required to create a smooth transition from the periphery of the patch 10 to the surrounding metal sheet. It can be very difficult to create this smooth transition with putty or body filler. Much sanding is required if the putty or filler is not applied perfectly.

A further advantage of the use of a thin layer of solid, high strength, pressure-sensitive adhesive is that it holds the patch very steady. This reduces the patch vibration relative to the metal sheet. By reducing vibration, one can use a one part flexible putty instead of a two part filler, thus further simplifying the repair for the novice.

The putty should be sufficiently flexible so that it will not crack at the edges of the patch due to vibration or due to expansion and contraction of the surface of the patch of damaged body. When tested in accordance with ASTM D 1737(62), the putty, when it is cured, should be capable of bending without cracking around at least a 50 mm mandrel when applied at 0.10 mm thickness at 22° C. A useful, commercially available putty is 3M Flexible Parts Material, available from Minnesota Mining and Manufacturing Company, St. Paul, Minn. This putty is described in U.S. Pat. No. 4,451,605, incorporated herein by reference. This putty is a one-part composition curable upon solvent evaporation having a viscosity in the range of 50,000 to 450,000 cps and comprises by volume 6 to 25 parts of a binder comprising substantially non-reactive solvent-soluble polyurethane having an elongation at break value of at least 175%, 43 to 68 parts solvent for the binder which will not substantially swell the substrate being repaired, and 20 to 42 parts talc filler, preferably having an average particle size of less than about 20 micrometers.

Putty is a single component material that requires no additional mixing by the ultimate user, whereas conventional fillers are two component materials. Novices often use the wrong ratios of filler components and obtain poor curing. In contrast, putty can be applied quite effectively by those with little or no experience. Furthermore, the air entrapment and moisture penetration problem mentioned previously does not occur with putty.

The method of repairing damaged metal surfaces will now be described in detail. Before applying the patch over a damaged surface, for example a hole 20 in a door 22, it is preferred that the area of the door surrounding the hole be straightened or bent to the proper contour as nearly as is practical.

The first step of the method involves cleaning the metal surface in the vicinity of the damaged area. The cleaning step involves grinding paint or rust in proximity of the damaged area to expose the bare metal surface. Then the bare metal surface is cleaned, preferably with detergent or solvent, to remove all traces of oil and dust, rinsed, and thoroughly dried. The bared surface should be considerably larger than the area of the patch 10 for purposes which will be later understood.

The second and third steps of the method involve providing the patch 10 and applying the patch to the damaged surface. If necessary, the patch should be cut to the appropriate size. Preferably, at least 4 cm of the patch should overlap the firm metal of the damaged panel. It is also preferred that all sharp corners of the patch 10 be rounded. The patch 10 may be bent to conform generally to the contour of the damaged surface to which it is applied. The protective release liner 16 is then removed, and the patch 10 is pressed firmly in place, preferably with an appropriate tool, e.g. a mallet or a roller, to provide a smooth surface in all areas where the patch 10 contacts the damaged surface.

The fourth step involves applying flexible putty 18 to the sheet metal surface surrounding the patch 10 and abutting the edge side 12c of patch 10 to eliminate the shoulder formed by the edge side 12c. The flexible putty 18 is applied to the sheet metal surface in thin coats. A squeegee or putty knife can be used to smooth the putty. If the putty 18 is applied carefully, it need not be sanded prior to priming and painting the patch 10 and repaired surface. However, it is preferred to sand each coat of putty after it has dried thoroughly. A sufficient amount of flexible putty should be applied so that a smooth transition running from the face side 12a of the patch 10 to the metal surface is obtained. If the damaged area is to be painted, the surface of the patch and the area surrounding the patch should first be primed with primer coat before painting.

Various modifications and alterations of this invention will become apparent to those skilled in the art without departing from the scope and spirit of this invention, and it should be understood that this invention is not to be limited to the illustrative embodiments set forth herein.

What is claimed is:

1. Method for repairing a damaged area in the surface of a body made of metal comprising the steps of:
    (1) exposing bare metal surface in the vicinity surrounding the damaged area to be repaired,
    (2) cleaning the bare metal surface,
    (3) providing a thin, corrosion-resistant patch consisting of a covering member having a face side, a back side, and an edge side bounded by the face side and the back side, said back side having a layer of adhesive coated thereon, said covering member having a thickness of from about 0.13 to about 0.46 mm, said layer of adhesive having a thickness of from about 0.05 to about 0.38 mm, said adhesive having a peel strength of at least 7 lb./in.,
    (4) applying said patch to the damaged surface, said back side of said patch being in contact with and adhering to the bare metal surface adjoining and surrounding the patch by means of said adhesive, and
    (5) applying flexible putty to the bare metal surface adjoining and surrounding the patch and abutting the edge side of the patch in an amount sufficient to obtain a smooth transition from the face side of the patch to the metal surface.

2. Method according to claim 1 further including the step of abrading said putty after it has dried to provide a feather edge in the damaged area.

3. Method according to claim 2 further including the step of applying primer coat to the repaired damaged area.

4. Method according to claim 3 further including the step of painting the primed repaired damaged area.

5. Method according to claim 1 further including the step of applying primer coat to the repaired damaged area.

6. Method according to claim 5 further including the step of painting the primed repaired damaged area.

7. Method according to claim 1 wherein the covering member of said patch is made of a tempered aluminum alloy.

8. Method according to claim 1 wherein said adhesive is a pressure-sensitive adhesive.

9. Method according to claim 1 wherein said cured putty is capable of bending around at least a 50 mm mandrel when applied at 0.10 mm thickness at 22° C. without cracking when tested in accordance with ASTM D 1737(62).

10. Method according to claim 1 further including the step of straightening or bending the body to the proper contour prior to applying said patch to the damaged area.

* * * * *